(12) United States Patent
Chen (10) Patent No.: US 11,040,751 B2
(45) Date of Patent: Jun. 22, 2021

(54) LONGITUDINAL TWO-WHEEL SOMATOSENSORY CAR

(71) Applicant: HANGZHOU CHIC INTELLIGENT TECHNOLOGY CO., LTD, Zhejiang (CN)

(72) Inventor: Hui Chen, Zhejiang (CN)

(73) Assignee: HANGZHOU CHIC INTELLIGENT TECHNOLOGY CO., LTD, Zhejiang (CN)

( * ) Notice: Subject to any disclaimer, the term of this patent is extended or adjusted under 35 U.S.C. 154(b) by 178 days.

(21) Appl. No.: 16/475,132

(22) PCT Filed: Mar. 3, 2017

(86) PCT No.: PCT/CN2017/075511
§ 371 (c)(1),
(2) Date: Jul. 1, 2019

(87) PCT Pub. No.: WO2018/120410
PCT Pub. Date: Jul. 5, 2018

(65) Prior Publication Data
US 2019/0329835 A1 Oct. 31, 2019

(30) Foreign Application Priority Data
Dec. 29, 2016 (CN) .......................... 201611248414.1

(51) Int. Cl.
*B62K 11/00* (2006.01)
*B62K 3/02* (2006.01)
*B62M 9/02* (2006.01)

(52) U.S. Cl.
CPC .............. *B62K 11/007* (2016.11); *B62K 3/02* (2013.01); *B62M 9/02* (2013.01)

(58) Field of Classification Search
CPC ........ B62K 3/02; B62K 11/007; B62K 11/10; B62K 23/08; B62K 2202/00;
(Continued)

(56) References Cited

U.S. PATENT DOCUMENTS

2019/0248439 A1* 8/2019 Wang ..................... B60L 53/60

FOREIGN PATENT DOCUMENTS

| CN | 203844935 | 9/2014 |
| CN | 104743023 | 7/2015 |

(Continued)

OTHER PUBLICATIONS

"International Search Report (Form PCT/ISA/210) of PCT/CN2017/075511," dated Sep. 18, 2017, with English translation thereof, pp. 1-4.

*Primary Examiner* — Minnah L Seoh
*Assistant Examiner* — Hosam Shabara
(74) *Attorney, Agent, or Firm* — JCIPRNET (57) ABSTRACT

A longitudinal two-wheel somatosensory car, comprising a car frame, and a front wheel and a rear wheel that are provided at the front and rear ends of the car frame. The rear wheel is connected to a drive motor which is used for driving the rear wheel. The two-wheel car further comprises a somatosensory platform. The somatosensory platform is built-in with an attitude sensor. The somatosensory platform in a mechanical transmission connection with the motor stator shaft of the drive motor. The traditional balanced structure, in which the wheels are provided on the left and right sides of a balanced car, is changed to a structure in which the moving wheels are provided at the front and the rear ends.

11 Claims, 5 Drawing Sheets

(58) Field of Classification Search
CPC ....... B62K 2204/00; B62M 6/50; B62M 6/55;
B62M 6/60; B62M 6/65; B62M 6/70;
B62M 9/02
USPC ......... 180/206.3, 206.4, 206.5, 206.6, 206.7,
180/220
See application file for complete search history.

(56) References Cited

FOREIGN PATENT DOCUMENTS

| | | |
|---|---|---|
| CN | 205022785 | 2/2016 |
| CN | 105365965 | 3/2016 |
| WO | 2016095209 | 6/2016 |

* cited by examiner

LONGITUDINAL TWO-WHEEL SOMATOSENSORY CAR

CROSS-REFERENCE TO RELATED APPLICATION

This is a 371 application of the International PCT application serial no. PCT/CN2017/075511, filed on Mar. 3, 2017 which claims the priority benefits of China Application No. 201611248414.1 filed on Dec. 29, 2016. The entirety of each of the above-mentioned patent applications is hereby incorporated by reference herein and made a part of this specification.

BACKGROUND OF THE INVENTION

1. Field of the Invention

The present invention relates to a longitudinal two-wheel somatosensory car.

2. Description of Related Art

With the development of electric vehicles and the improvement of people's living standards, electric vehicles have become the daily means of transportation for people, especially the two-wheel scooter is more practical in sightseeing or patrol, such as the somatosensory electric balanced car. Based on an internal gyroscope and an acceleration sensor in the car body, the change of the car body attitude is detected and the balance of the car body movement is achieved through motor drive. In recent years, the somatosensory electric balanced car has been widely used in eco-tourism scenic spots, large parks, airports, and upscale residential areas as a means of transportation for leisure and patrol. However, the movement speed of the traditional somatosensory electric balanced car on the market is generally recommended to be no more than yards per hour. When the speed is excessively high, excessively large current is easily caused, and the motherboard is burned out, and for the traditional somatosensory electric balanced car, when the direction is out of control and the balanced car is about to fall over, because the wheels are disposed on the left and right sides of the human body and the front handle is disposed in front of the human body, the human body cannot exit from the balanced car in time. Finally, the human falls over with the balanced car, and a safety accident easily occurs.

SUMMARY OF THE INVENTION

In view of this, the present invention is directed to provide a longitudinal two-wheel somatosensory car with a simple structure and secure and reliable use.

To achieve the foregoing objective, the present invention uses the following technical solutions:

A longitudinal two-wheel somatosensory car, including a car frame, and a front wheel and a rear wheel that are provided on front and rear ends of the car frame, where the rear wheel is connected to a drive motor used for driving the rear wheel to rotate, the two-wheel car further includes a somatosensory platform, the somatosensory platform is built-in with an attitude sensor, and the somatosensory platform is in a mechanical transmission connection to a motor stator shaft of the drive motor.

Preferably, in the foregoing longitudinal two-wheel somatosensory car, the drive motor is an external rotor motor fixedly connected to the car frame and including an external rotor and an internal stator that are coaxial, an outer end of the external rotor is fixedly connected to a driving wheel that coaxially rotates with the external rotor, the driving wheel is in a transmission connection to a driven wheel that is fixedly disposed on the rear wheel and that rotates coaxially with the rear wheel, and two ends of a motor stator shaft of the internal stator respectively extend outward to be connected to the somatosensory platform.

Preferably, in the foregoing longitudinal two-wheel somatosensory car, the drive motor is an external rotor type hub motor, fixedly mounted in a hub of the rear wheel, a motor stator shaft of the hub motor is in a transmission connection to a driven wheel that is fixedly disposed on the somatosensory platform and that rotates coaxially with the somatosensory platform.

Preferably, in the foregoing longitudinal two-wheel somatosensory car, the somatosensory platform is a sitting-type somatosensory platform or a standing-type somatosensory platform.

Preferably, in the foregoing longitudinal two-wheel somatosensory car, the two-wheel car further includes a steering handle connected to the front wheel.

Preferably, in the foregoing longitudinal two-wheel somatosensory car, the two-wheel car is in a modular structural design, and respectively includes a front drive module, a rear drive module, and a somatosensory platform module that are independent from each other and that can be assembled and connected with each other. The front drive module includes a front drive skeleton, the steering handle and the front wheel. The steering handle passes through a mounting hole of a front section of the front drive skeleton to be connected to the front wheel disposed on a bottom end of the front drive skeleton. The rear drive module includes a rear drive skeleton, and the drive motor and the rear wheel. The rear wheel and the rear drive skeleton are fixedly mounted and connected; the somatosensory platform module includes the somatosensory platform; the front drive skeleton and the rear drive skeleton are assembled and connected to each other to form the car frame. The somatosensory platform module is fixedly mounted and connected at a coaxial connection location of the front drive skeleton and the rear drive skeleton.

Preferably, in the foregoing longitudinal two-wheel somatosensory car, the two-wheel car further includes a shock absorption module. The shock absorption module is fixedly mounted and disposed between the front drive skeleton and the rear drive skeleton, one end of the shock absorption module is connected to the front drive skeleton, and the other end is connected to the rear drive skeleton.

Preferably, in the foregoing longitudinal two-wheel somatosensory car, coaxial first openings are disposed on two sides of an upper end of the front drive skeleton, and coaxial second openings are disposed on an upper end of the rear drive skeleton, and pivot connection members corresponding to the first openings and the second openings are respectively correspondingly disposed on two ends of the shock absorption module.

Preferably, in the foregoing longitudinal two-wheel somatosensory car, the front drive skeleton includes a skeleton body and a front drive upper cover in a fitting connection to the skeleton body. A battery cavity is disposed in the skeleton body, and a battery pack is built in the battery cavity.

Compared with the prior art, the beneficial effects of the present invention are mainly reflected in the following aspects:

(1) In this technical solution, the traditional balanced structure, in which the wheels are provided on the left and right sides of a balanced car, is changed to a structure in which the moving wheels are provided at the front and the rear ends. Therefore, both sides of a user's body, especially both sides of the feet are unobstructed, i.e., there is no wheel that acts as a barrier, such that when the direction of the balanced car is out of control and the balanced car is about to fall over, the following situation will be avoided, i.e., a person cannot exit from a balanced car in time as the wheels are provided on the left and right sides of the body and a front handle is provided in front of the body. The electric car is far safer to drive.

(2) In this technical solution, the external rotor motor is used as the drive motor. The driving wheel fixed on the external rotor of the external rotor motor rotates coaxially with the external rotor to transmit the driven wheel to rotate, thereby driving the rear wheel to rotate. The motor stator shaft of the external rotor motor is connected to the somatosensory platform. In a motor rotation process, the external rotor of the external rotor motor moves relative to the internal stator. When the external rotor moves to drive the rear wheel to move, the stator also receives a reaction force. Because the motor stator shaft of the external rotor motor is connected to the somatosensory platform, in this way, the reaction force can be transmitted to a person standing on the somatosensory platform through the somatosensory platform, to perform corresponding adjustment by adjusting an angle of the somatosensory platform, thereby achieving an objective of somatosensory control.

(3) In this technical solution, the external rotor type hub motor is used as the drive motor, and the hub motor is directly mounted and fixed in a hub of the rear wheel, so that on one hand, the occupied volume is reduced, and on the other hand, the motor stator shaft of the hub motor is in a transmission connection to the driven wheel that is fixedly disposed on the somatosensory platform and that coaxially rotates with the somatosensory platform. Similarly, when the external rotor of the hub motor moves to drive the rear wheel to move, the stator also receives a reaction force. Because the motor stator shaft of the hub motor is connected to the somatosensory platform through a transmission mechanism, in this way, the reaction force can be transmitted to the somatosensory platform through the transmission mechanism and then transmitted to a person standing on the somatosensory platform, to perform corresponding adjustment by adjusting an angle of the somatosensory platform, thereby achieving an objective of somatosensory control.

(4) In this technical solution, the modular structural design is used. The front wheel, the front drive skeleton, and the steering handle are integrated into the front drive module. The rear wheel, the rear drive skeleton, and the drive motor are integrated into the rear drive module. The somatosensory platform is integrated into the somatosensory platform module. The advantage of modularization lies in facilitating replacement, and optimizing a production process, so that production division is more meticulous and clear, to reduce production costs, and after-sales maintenance is also convenient.

(5) In this technical solution, the shock absorption module is disposed between the front drive skeleton and the rear drive skeleton. When the front drive module and the rear drive module are pressed due to a shock, the shock absorption module contracts, and the somatosensory platform on which the user is located sinks down in small amplitude, so that the shock felt by the user during experience is minimized. In addition, the somatosensory platform restores under a buffer effect of the shock absorption module, and the user has somatosensory experience of overweight; meanwhile, a corresponding pedal angle adjustment is performed. In the traditional front and rear shock absorption solution, a feeling of slight bump on front and rear ends is generated, and in this solution, the somatosensory effect after shock absorption is longitudinal fluctuation, and the somatosensory effect after shock absorption is good.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

As shown in FIG. 1 to FIG. 9, a longitudinal two-wheel somatosensory car includes a car frame 1, and a front wheel 2 and a rear wheel 3 that are provided on front and rear ends of the car frame 1. The rear wheel 3 is connected to a drive motor 5 used for driving the rear wheel to rotate. The two-wheel car further includes a somatosensory platform 6, the somatosensory platform 6 is built-in with an attitude sensor, and the somatosensory platform 6 is in a mechanical transmission connection to a motor stator shaft 51 of the drive motor 5. In this structural design, the traditional balanced structure, in which the wheels are provided on left and right sides of a balanced car, is changed to a structure in which the moving wheels are provided at the front and the rear ends. Therefore, both sides of a user's body, especially both sides of the feet are unobstructed where there is no wheel that acts as a barrier, such that when a direction of the balanced car is out of control and the balanced car is about to fall over, the following situation will be avoided, i.e., a person cannot exit from a balanced car in time as the wheels are provided on the left and right sides of the body and a front handle is provided in front of the body. The electric car is far safer to drive.

Embodiment 1

As shown in FIG. 1 to FIG. 5, the drive motor 5 is an external rotor motor fixedly connected to the car frame 1 and including an external rotor 50 and an internal stator that are coaxial. An outer end of the external rotor 50 is fixedly connected to a driving wheel 7 that coaxially rotates with the external rotor 50. The driving wheel 7 is in a transmission connection to a driven wheel 8 that is fixedly disposed on the rear wheel 3 and that rotates coaxially with the rear wheel 3, and two ends of a motor stator shaft 51 of the internal stator respectively extend outward to be connected to the somatosensory platform 6.

A manner of a transmission connection between the driving wheel 7 and the driven wheel 8 is chain transmission or belt transmission. When the chain transmission manner is used, the driving wheel 7 and the driven wheel 8 respectively use a chain wheel structure, and an annular chain is used between the driving wheel 7 and the driven wheel 8 for closing and engagement. When a belt transmission manner is used, the driving wheel 7 and the driven wheel 8 respectively use a belt wheel structure, and an annular belt is used between the driving wheel 7 and the driven wheel 8 for closing and connection.

In addition, two ends of the motor stator shaft 51 of the internal stator respectively extend outward and a manner of connection between the two ends and the somatosensory platform 6 may be a direct connection or a connection using a somatosensory platform transmission mechanism 9.

Figure 1:
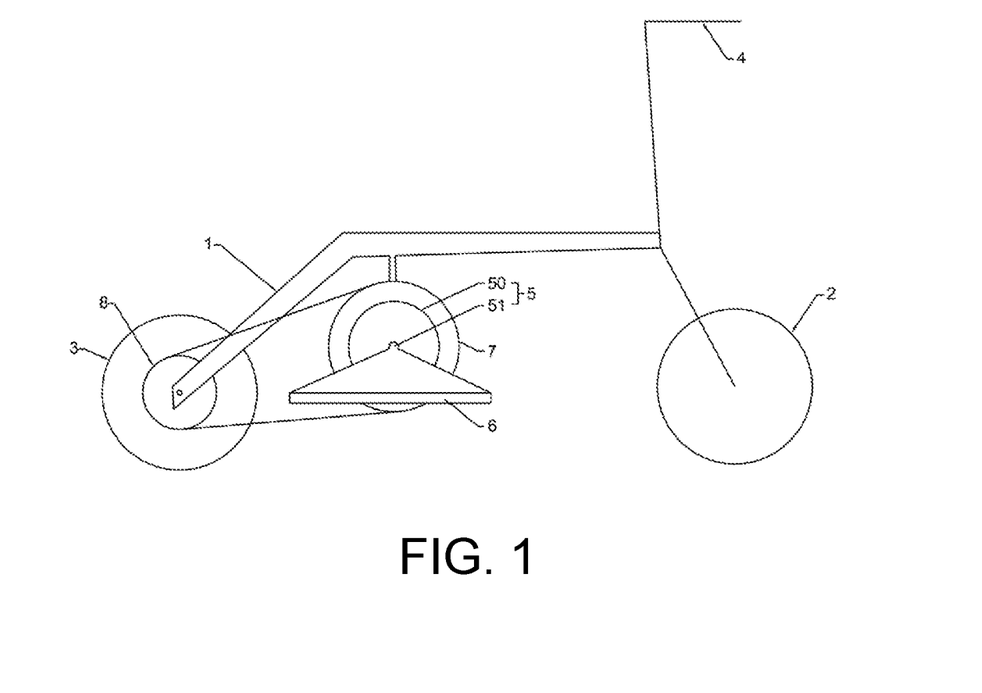
FIG. 1 is a schematic diagram 1 of a structural principle of Embodiment 1 of the present invention.
Figure 2:
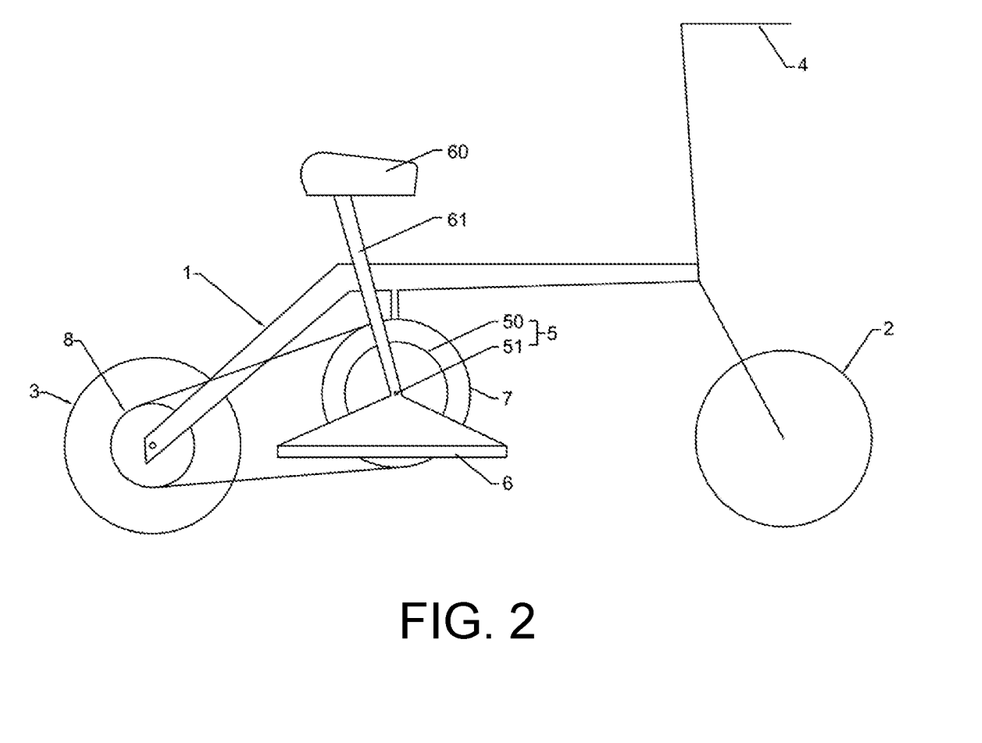
FIG. 2 is a schematic diagram 2 of a structural principle of Embodiment 1 of the present invention.

As shown in FIG. 1 and FIG. 2, the two ends of the motor stator shaft 51 of the internal stator respectively extend outward to be directly connected to the somatosensory platform 6. In a manner shown in FIG. 1, the somatosensory platform 6 is a pedal, and a manner of a standing-type somatosensory platform in is used, a status and attitude sensor is disposed in the pedal, and the user stands with two feet above the pedal. As the manner shown in FIG. 2, the somatosensory platform 6 is a sitting-type somatosensory platform and includes a seat pad and a seat pillar. The status and attitude sensor is disposed in the seat pad, and is connected to the motor stator shaft 51 of the internal stator by using the seat pillar. Certainly, one end of the seat pillar may further be connected to the pedal into a whole, or may be not connected to the pedal into a whole.

Figure 3:
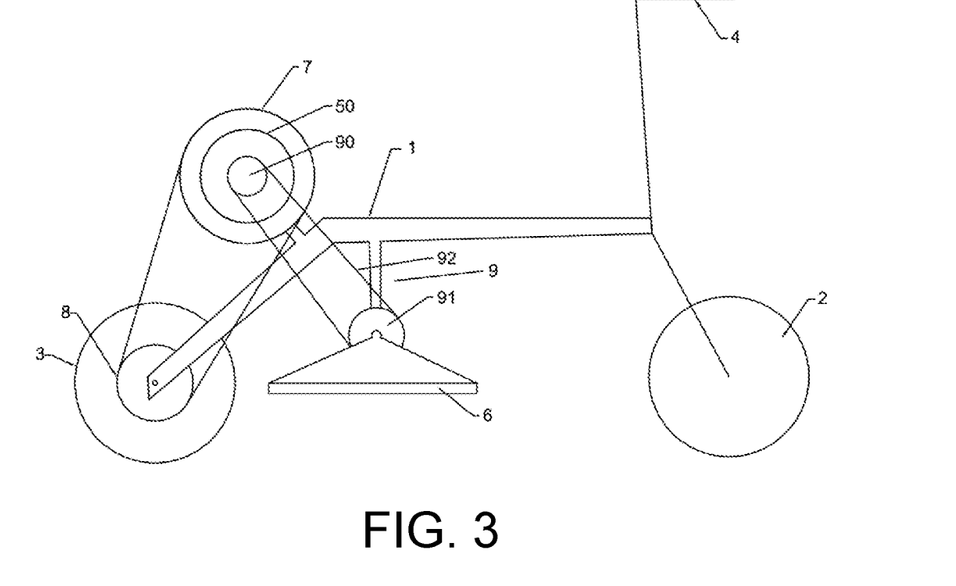
FIG. 3 is a schematic diagram 3 of a structural principle of Embodiment 1 of the present invention.
Figure 4:
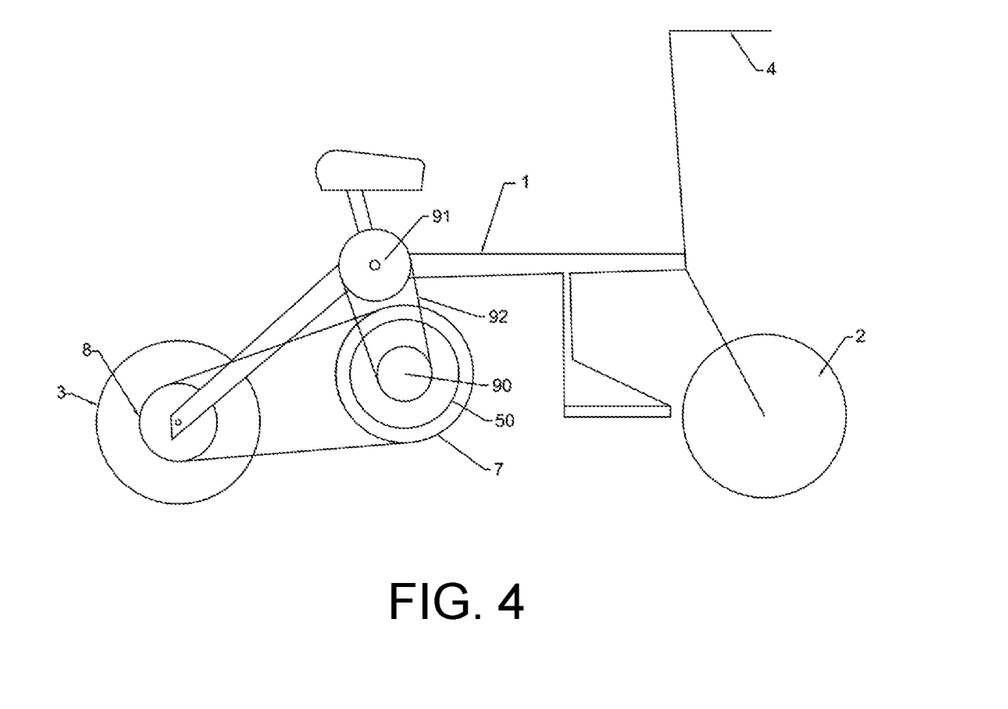
FIG. 4 is a schematic diagram 4 of a structural principle of Embodiment 1 of the present invention.
Figure 5:
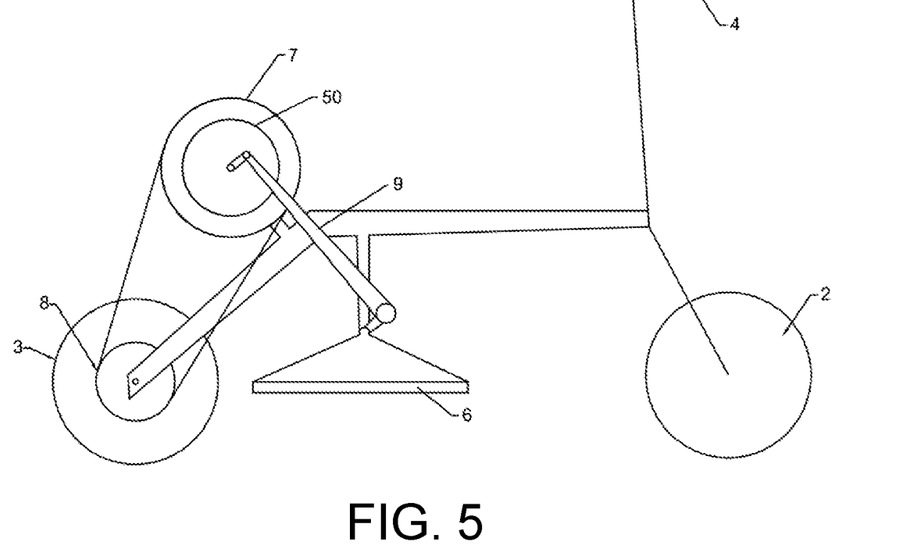
FIG. 5 is a schematic diagram 5 of a structural principle of Embodiment 1 of the present invention.

As shown in FIG. 3, FIG. 4 and FIG. 5, the two ends of the motor stator shaft 51 of the internal stator respectively extend outward to be connected to the somatosensory platform 6 by using the somatosensory platform transmission mechanism 9.

As shown in FIG. 3 and FIG. 4, the somatosensory platform transmission mechanism 9 is an annular chain transmission apparatus, and includes a driving chain wheel 90 fixedly connected to the motor stator shaft 51, a driven chain wheel 91 fixedly connected to the somatosensory platform 6, and an annular chain 92 engaged with the driving chain wheel 90 and the driven chain wheel 91 in a closing manner. Certainly, another transmission apparatus may also be used. For example, the somatosensory platform transmission mechanism 6 is an annular belt transmission apparatus, and includes an annular belt and a belt wheel that is connected to the somatosensory platform. The annular belt is connected to the motor stator shaft and the belt wheel in a closing manner. FIG. 3 differs from FIG. 4 in that, the somatosensory platform shown in FIG. 3 is a standing-type somatosensory platform, and the somatosensory platform shown in FIG. 4 is a sitting-type somatosensory platform.

As shown in FIG. 5, the somatosensory platform transmission mechanism 9 is a screw transmission apparatus or a worm-and-gear transmission apparatus. When the screw transmission apparatus is used, the somatosensory platform transmission mechanism 9 includes a screw, and two ends of the screw are respectively connected to chain wheels with the wheel in a fitting manner, and chain wheels on the two ends of the screw are respectively engaged with a gear member of the motor stator shaft and a gear member of the somatosensory platform. Therefore, when the motor stator shaft receives a reaction force, the motor stator shaft drives a chain wheel that is on one end of the screw and that is engaged with it to rotate through the gear member of the motor stator shaft, to convert into linear movement of the screw. The linear movement of the screw is converted into rotation relative to the chain wheel on the other end, to drive the somatosensory platform to rotate. Similarly, a worm-and-gear transmission apparatus may also be used, and the transmission structure thereof is a common technical means in the art, and the descriptions thereof are omitted herein.

In this technical solution, the external rotor motor is used as the drive motor. The driving wheel fixed on the external rotor of the external rotor motor rotates coaxially with the external rotor to transmit the driven wheel to rotate, thereby driving the rear wheel to rotate. The motor stator shaft of the external rotor motor is connected to the somatosensory platform. In a motor rotation process, the external rotor of the external rotor motor moves relative to the internal stator. When the external rotor moves to drive the rear wheel to move, the stator also receives a reaction force. Because the motor stator shaft of the external rotor motor is connected to the somatosensory platform, in this way, the reaction force can be transmitted to a person standing on the somatosensory platform through the somatosensory platform, to perform corresponding adjustment by adjusting an angle of the somatosensory platform, thereby achieving an objective of somatosensory control.

Embodiment 2

Figure 6:
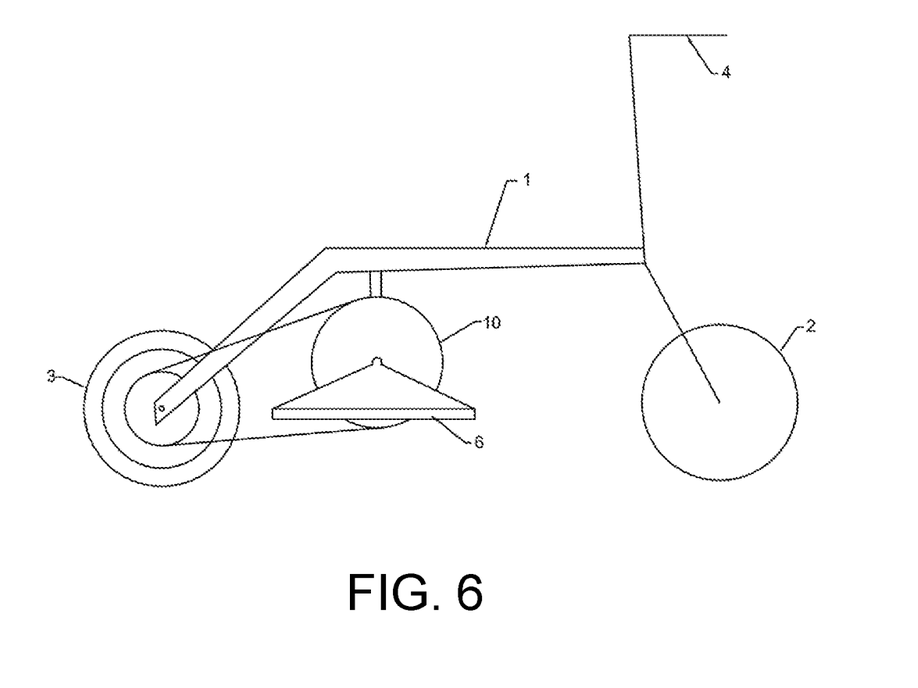
FIG. 6 is a schematic diagram 1 of a structural principle of Embodiment 2 of the present invention.
Figure 7:
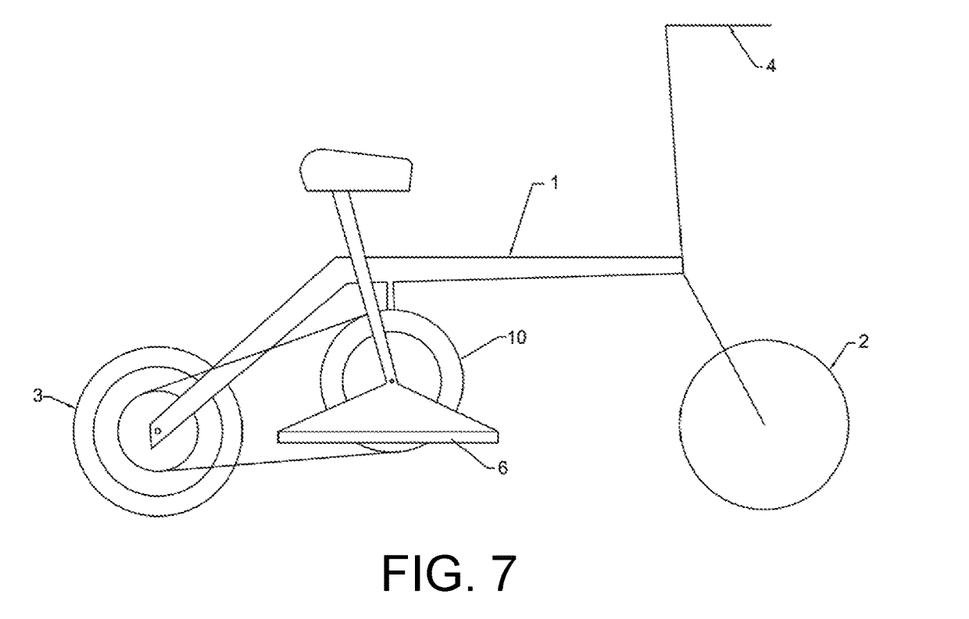
FIG. 7 is a schematic diagram 2 of a structural principle of Embodiment 2 of the present invention.
Figure 8:
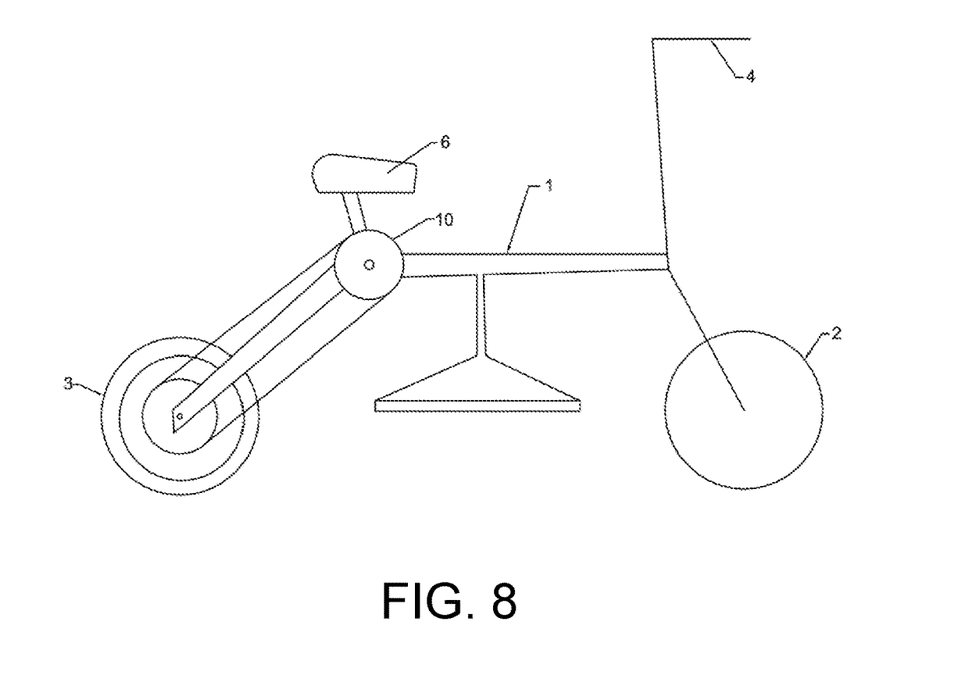
FIG. 8 is a schematic diagram 3 of a structural principle of Embodiment 2 of the present invention.

As shown in FIG. 6 to FIG. 8, the drive motor 5 is an external rotor type hub motor, fixedly mounted in a hub of the rear wheel 3, a motor stator shaft 51 of the hub motor is in a transmission connection to a driven wheel 10 that is fixedly disposed on the somatosensory platform 6 and that rotates coaxially with the somatosensory platform 6. Similar to Embodiment 1, a manner of a transmission connection between the motor stator shaft 51 and the driven wheel may be chain transmission or belt transmission. Certainly, the manner used for the somatosensory platform 6 may be a standing-type somatosensory platform (as shown in FIG. 6), or a sitting-type somatosensory platform (as shown in FIG. 7 and FIG. 8). The external rotor type hub motor is used as the drive motor, so that on one hand, the occupied volume is reduced, and on the other hand, the motor stator shaft of the hub motor is in a transmission connection to the driven wheel that is fixedly disposed on the somatosensory platform and that coaxially rotates with the somatosensory platform. Similarly, when the external rotor of the hub motor moves to drive the rear wheel to move, the stator also receives a reaction force. Because the motor stator shaft of the hub motor is connected to the somatosensory platform through a transmission mechanism, in this way, the reaction force can be transmitted to the somatosensory platform through the transmission mechanism and then transmitted to a person standing on the somatosensory platform, to perform corresponding adjustment by adjusting an angle of the somatosensory platform, thereby achieving an objective of somatosensory control.

Embodiment 3

Figure 9:
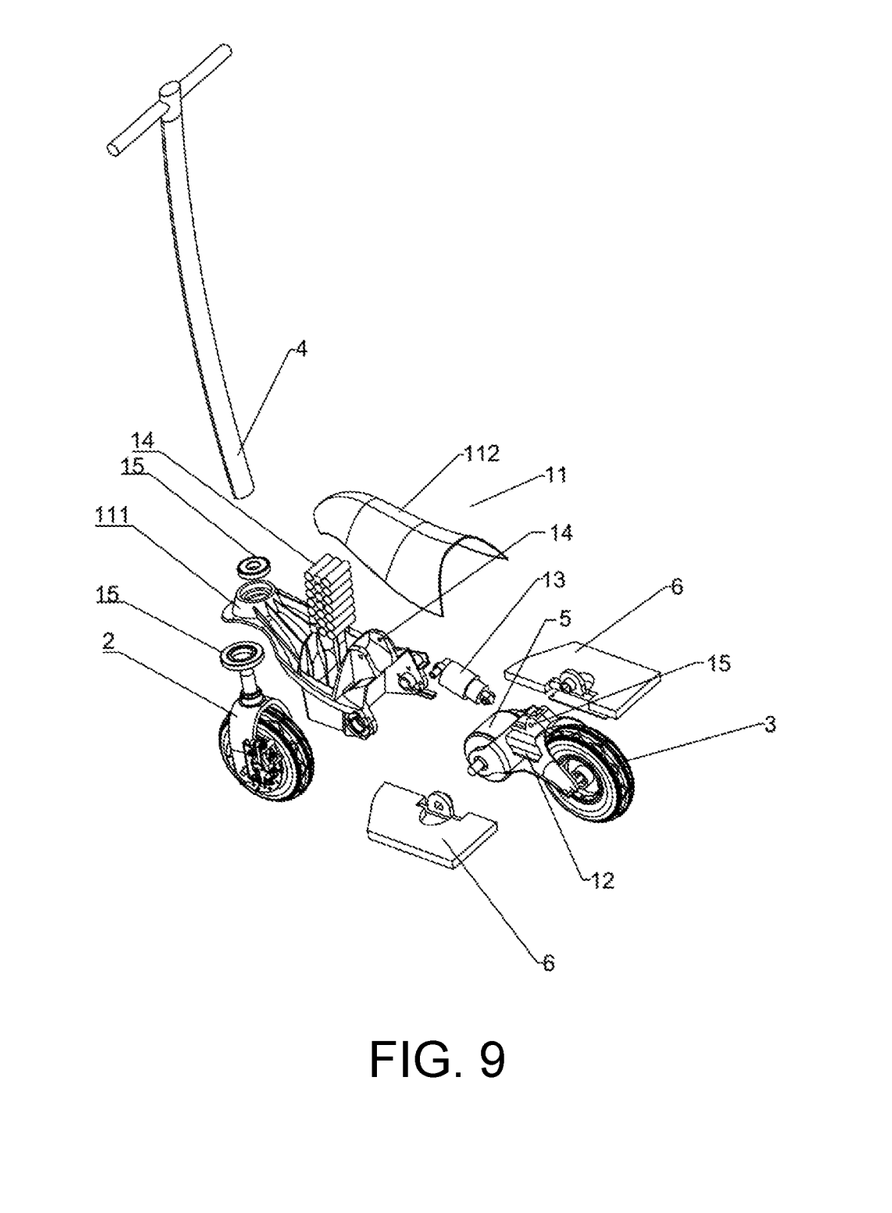
FIG. 9 is a schematic structural diagram of Embodiment 3 of the present invention.

As shown in FIG. 9, the two-wheel car also includes a steering handle 4 connected to the front wheel 2, and is in a modular structural design, and respectively includes a front drive module, a rear drive module, and a somatosensory platform module that are independent of each other and that can be assembled and connected to each other. The front drive module includes a front drive skeleton 11, and the steering handle 4 and the front wheel 2. The steering handle 4 passes through a mounting hole of a front section of the front drive skeleton 11 to be connected to the front wheel 2 disposed on a bottom end of the front drive skeleton 11. The rear drive module includes a rear drive skeleton 12, and the drive motor 5 and the rear wheel 3. The rear wheel 3 and the rear drive skeleton 12 are fixedly mounted and connected; the somatosensory platform module includes the somatosensory platform 6. The front drive skeleton 11 and the rear drive skeleton 12 are assembled and connected with each other to form the car frame 1. The somatosensory platform module is fixedly mounted and connected at a coaxial connection location of the front drive skeleton 11 and the rear drive skeleton 12. The modular structural design is used. The front wheel, the front drive skeleton, and the steering handle are integrated into the front drive module; the rear wheel, the rear drive skeleton, and the drive motor are integrated into the rear drive module. The somatosensory platform is integrated into the somatosensory platform module. The advantage of modularization lies in facilitating replacement, and optimizing a production process, so that production division is more meticulous and clear, to reduce production costs, and after-sales maintenance is also convenient.

In addition, the two-wheel car further includes a shock absorption module 13. The shock absorption module 13 is fixedly mounted and disposed between the front drive skeleton 11 and the rear drive skeleton 12, one end of the shock absorption module is connected to the front drive skeleton 11, and the other end is connected to the rear drive skeleton 12. Specifically, coaxial first openings 14 are disposed on two sides of an upper end of the front drive skeleton 11, and coaxial second openings 15 are disposed on an upper end of the rear drive skeleton 12, and pivot connection members corresponding to the first openings 14 and the second openings 15 are respectively correspondingly disposed on two ends of the shock absorption module 13. When the front drive module and the rear drive module are pressed due to a shock, the shock absorption module contracts, and the somatosensory platform on which the user is located sinks down in small amplitude, so that the shock felt by the user during experience is minimized. In addition, the somatosensory platform restores under a buffer effect of the shock absorption module, and the user has somatosensory experience of overweight; meanwhile, a corresponding pedal angle adjustment is performed. In the traditional front and rear shock absorption solution, a feeling of slight bump on front and rear ends is generated, and in this solution, the somatosensory effect after shock absorption is longitudinal fluctuation, and the somatosensory effect after shock absorption is good.

In addition, the front drive skeleton 11 includes a skeleton body 111 and a front drive upper cover 112 in a fitting connection to the skeleton body. A battery cavity is disposed in the skeleton body 111, and a battery pack 14 for supplying power to the drive motor and the somatosensory platform module is built in the battery cavity, and the whole structure is compact.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A longitudinal two-wheel somatosensory car, comprising a car frame, and a front wheel and a rear wheel that are provided on front and rear ends of the car frame, wherein the rear wheel is connected to a drive motor used for driving the rear wheel to rotate, the two-wheel car further comprises a somatosensory platform, the somatosensory platform is built-in with an attitude sensor, and the somatosensory platform is in a mechanical transmission connection to a motor stator shaft of the drive motor.

2. The longitudinal two-wheel somatosensory car according to claim 1, wherein the drive motor is an external rotor motor fixedly connected to the car frame and including an external rotor and an internal stator that are coaxial, an outer end of the external rotor is fixedly connected to a driving wheel that coaxially rotates with the external rotor, the driving wheel is in a transmission connection to a driven wheel that is fixedly disposed on the rear wheel and that rotates coaxially with the rear wheel, and two ends of a motor stator shaft of the internal stator respectively extend outward to be connected to the somatosensory platform.

3. The longitudinal two-wheel somatosensory car according to claim 1, wherein the drive motor is an external rotor type hub motor, fixedly mounted in a hub of the rear wheel, a motor stator shaft of the hub motor is in a transmission connection to a driven wheel that is fixedly disposed on the somatosensory platform and that rotates coaxially with the somatosensory platform.

4. The longitudinal two-wheel somatosensory car according to claim 1, wherein the somatosensory platform is a sitting-type somatosensory platform or a standing-type somatosensory platform.

5. The longitudinal two-wheel somatosensory car according to claim 1, wherein the two-wheel car further comprises a steering handle connected to the front wheel.

6. The longitudinal two-wheel somatosensory car according to claim 5, wherein the two-wheel car is in a modular structural design, and respectively comprises a front drive module, a rear drive module, and a somatosensory platform module that are independent from each other and that are able to be assembled and connected with each other; the front drive module comprises a front drive skeleton, and the steering handle and the front wheel; the steering handle passes through a mounting hole of a front section of the front drive skeleton to be connected to the front wheel disposed on a bottom end of the front drive skeleton; the rear drive module comprises a rear drive skeleton, the drive motor and the rear wheel; the rear wheel and the rear drive skeleton are fixedly mounted and connected; the somatosensory platform module comprises the somatosensory platform; the front drive skeleton and the rear drive skeleton are assembled and connected to each other to form the car frame; and the somatosensory platform module is fixedly mounted and connected at a coaxial connection location of the front drive skeleton and the rear drive skeleton.

7. The longitudinal two-wheel somatosensory car according to claim 6, wherein the two-wheel car further comprises a shock absorption module; the shock absorption module is fixedly mounted and disposed between the front drive skeleton and the rear drive skeleton, one end of the shock absorption module is connected to the front drive skeleton, and the other end is connected to the rear drive skeleton.

8. The longitudinal two-wheel somatosensory car according to claim 7, wherein coaxial first openings are disposed on two sides of an upper end of the front drive skeleton, and coaxial second openings are disposed on an upper end of the rear drive skeleton, and pivot connection members corresponding to the first openings and the second openings are respectively correspondingly disposed on two ends of the shock absorption module.

9. The longitudinal two-wheel somatosensory car according to claim 6, wherein the front drive skeleton comprises a skeleton body and a front drive upper cover in a fitting connection to the skeleton body; a battery cavity is disposed in the skeleton body, and a battery pack is built in the battery cavity.

10. The longitudinal two-wheel somatosensory car according to claim 2, wherein the somatosensory platform is a sitting-type somatosensory platform or a standing-type somatosensory platform.

11. The longitudinal two-wheel somatosensory car according to claim 3, wherein the somatosensory platform is a sitting-type somatosensory platform or a standing-type somatosensory platform.

\* \* \* \* \*